Patented May 15, 1923.

1,455,448

UNITED STATES PATENT OFFICE.

GUSTAV PETERS, OF WORMS, GERMANY.

PROCESS OF MANUFACTURE OF DIPHENYLENEDIKETONES FROM ANTHRACENE COMPOUNDS.

No Drawing.     Application filed August 9, 1921. Serial No. 491,023.

*To all whom it may concern:*

Be it known that I, GUSTAV PETERS, a citizen of Germany, residing at Worms, Germany, have invented certain new and useful Improvements in Processes of Manufacture of Diphenylenediketones from Anthracene Compounds (for which I have filed applications in Germany, filed May 18, 1918; Dec. 27, 1919; Austria, filed June 18, 1919; Hungaria, filed July 8, 1919; Czechoslovakia, July 21, 1919; Switzerland, May 17, 1919, Patent No. 84262; Denmark, June 11, 1919; Sweden, May 14, 1919, Patent No. 48662; Norway, June 11, 1917, Patent No. 31823; Netherlands, May 17, 1919, Patent No. 5401), of which the following is a specification.

The present process refers to the manufacture of diphenylenediketones from anthracene compounds by oxidizing agents.

The present process consists in causing oxygen to act on anthracene compounds in the presence of oxygen carriers, i. e. oxygen containing substances which give off oxygen easily and combine easily with oxygen. As suitable oxygen carriers I have found especially nitrogen oxygen compounds, nitrous oxide, nitric oxide, nitrosylchloride, nitrogen trioxide, nitrogen peroxide, nitrogen pentoxide or nitric acid. I may use a single nitrogen oxygen compound or mixtures of several nitrogen oxygen compounds. I may use the nitrogen oxygen compounds in admixture with other catalysts as metal oxides, for instance cobalt, nickel, iron, manganese oxides or such like or metal salts, for instance sulphates, nitrates, acetates, propionates of cobalt, nickel, iron, manganese or such like. The process is carried out by suspending or dissolving the anthracene compounds in aliphatic organic acids, as acetic acid, especially acid which is concentrated, or free of water, as so called glacial acetic acid. I may add indifferent non-acid diluents for instance dichlorbenzene, nitrobenzene.

In case aliphatic acids are used the temperature is preferably maintained below the boiling point of the aliphatic acids in order to eliminate gaseous products as for instance the nitrogen oxygen compounds.

The action of oxygen is carried out by suitably heating the mixture, if desired under pressure.

As oxygen I may use oxygen or oxygen containing gases or vapours, as for instance air, liquefied and afterwards gasified air, which may have a higher proportion in oxygen than corresponding to the ordinary air or such like. I may prepare anthraquinone by means of the present process from anthracene, oxanthranol, monochloranthracene, dichloranthracene or I may prepare derivatives of the anthraquinone as anthraquinonedisulphonic acids from anthracenedisulphonic acids.

The following examples may illustrate the invention:

1. 100 kilos of anthracene are thoroughly mixed in a boiler with 500–1000 kilos of concentrated acetic acid at about 80–90° C. a small proportion of fuming nitric acid is added and oxygen is introduced under pressure. The necessary proportion of oxygen is rapidly absorbed and after about 3–5 hours the oxidation is complete.

2. 50 kilos of anthracene are stirred in a boiler with 500 kilos of concentrated acetic acid at 80–90° C. and 100 grams of cobalt nitrate, while oxygen containing a small percentage of nitrous gases is introduced. The oxidation is finished in some hours. In like manner derivatives such as anthracene sulphonic acids can be oxidized to corresponding quinone compounds.

3. 50 kilos of anthracene of 90 per cent strength are heated to 90° C. in a closed vessel with 250 kilos of propionic acid, while stirring, oxygen is now introduced while simultaneously dropping in $NO_2$ or passing in gaseous $NO_2$. The oxygen is violently absorbed and the anthracene becomes anthraquinone. After some hours the reaction is finished. The anthraquinone is filtered. Yield, 90–95 per cent. Melting point, 278° C., degree of purity, 95 per cent.

4. The procedure is the same as in example 1, the solvent or suspension agent being glacial acetic acid with addition of 20 per cent of dichlorbenzene. Yield point, melting point, degree of purity as in example 1.

5. The procedure is the same as in example 1, the solvent or suspension agent being acetic acid to which 20 per cent water has been added. Yield, 95–98 per cent. Melting point, 276° C., degree of purity, 92–95 per cent.

I claim:

1. Process for manufacturing diphenylene diketones which comprises, heating anthracene compounds with free oxygen in the presence of an organic solvent and a relatively small quantity of an oxygen carrier.

2. Process for manufacturing diphenylene diketones which comprises heating anthracene compounds with free oxygen in the presence of an organic acid, and a nitrogen-oxygen compound, said nitrogen oxygen compound being insufficient in quantity to accomplish the oxidation.

3. Process for manufacturing diphenylene diketones which comprises heating anthracene with free oxygen in the presence of a relatively small quantity of an oxygen carrier, an organic solvent and an indifferent diluent.

4. Process of manufacturing diphenylene diketones which comprises heating anthracene with free oxygen in the presence of an aliphatic acid, an oxygen carrier, and a catalytic body.

5. Process of manufacturing diphenylene diketones which comprises heating anthracene dissolved in an aliphatic acid containing an indifferent diluent with free oxygen in the presence of an oxid of nitrogen and a metal oxid catalyst.

6. Process of manufacturing diphenylene diketones which comprises heating anthracene with free oxygen in the presence of nitrogen oxygen compounds and a metal compound catalyst.

In testimony whereof I hereunto affix my signature.

GUSTAV PETERS.